(12) United States Patent
Brown

(10) Patent No.: US 9,346,659 B2
(45) Date of Patent: May 24, 2016

(54) HYBRID BEVERAGE DISPENSER

(71) Applicant: Manitowoc Foodservice Companies, LLC, Manitowoc, WI (US)

(72) Inventor: James W. Brown, Crestwood, KY (US)

(73) Assignee: MANITOWOC FOODSERVICE COMPANIES, LLC, Manitowoc, WI (US)

( * ) Notice: Subject to any disclaimer, the term of this patent is extended or adjusted under 35 U.S.C. 154(b) by 0 days.

(21) Appl. No.: 14/281,328

(22) Filed: May 19, 2014

(65) Prior Publication Data

US 2015/0069087 A1 Mar. 12, 2015

Related U.S. Application Data

(60) Provisional application No. 61/825,206, filed on May 20, 2013.

(51) Int. Cl.
| | |
|---|---|
| *B67D 1/08* | (2006.01) |
| *B67D 1/00* | (2006.01) |
| *G06F 3/041* | (2006.01) |
| *A47J 31/40* | (2006.01) |

(Continued)

(52) U.S. Cl.
CPC ............ *B67D 1/0888* (2013.01); *A47J 31/401* (2013.01); *A47J 31/41* (2013.01); *A47J 43/27* (2013.01); *B67D 1/0021* (2013.01); *G06F 3/041* (2013.01); *A47G 2019/122* (2013.01); *A47K 5/1217* (2013.01); *B29B 7/7663* (2013.01); *B67D 7/163* (2013.01)

(58) Field of Classification Search
CPC ........... B29B 7/7663; B05C 17/00553; B65D 81/3283; B67D 1/0021; B67D 7/163; B67D 1/0888; A47G 2019/122; A61M 15/009; A47K 5/1217; A47J 31/401; A47J 31/41; A47J 43/27; G06F 3/041
USPC .......... 222/129.1, 144.5, 145.5, 145.6, 145.1, 222/23, 42, 52, 146.6, 132
See application file for complete search history.

(56) References Cited

U.S. PATENT DOCUMENTS 3,266,672 A * 8/1966 Dean ........................ 222/129.1
4,068,781 A   1/1978 Toth
(Continued)

OTHER PUBLICATIONS

International Search Report dated Oct. 30, 2014 for PCT application No. PCT/US2014/038609.
(Continued)

*Primary Examiner* — Frederick C Nicolas
(74) *Attorney, Agent, or Firm* — Ohlandt, Greeley, Ruggiero & Perle, L.L.P.

(57) ABSTRACT

Disclosed is a hybrid beverage dispenser that can be configured in a number of flexible arrangements, providing the opportunity for a configurable beverage dispensing "station" having a variable "footprint". The hybrid beverage dispenser may have "on board" refrigeration and/or heating system for providing both hot and cold beverages from the same dispenser. A remote chiller may provide chilled syrups for the beverages. Also disclosed is a countertop hybrid beverage dispensing unit for situations where limited space is an issue. Also disclosed is a hybrid beverage dispenser that provides the ability to dispense from one dispenser beverages which usually are dispensed from separate dispensers. The countertop unit possesses the same beverage dispensing flexibility; however, all ingredients are remotely chilled and pumped to the point of dispensing.

18 Claims, 8 Drawing Sheets

(51) Int. Cl.
*A47J 31/41* (2006.01)
*A47J 43/27* (2006.01)
*B67D 7/16* (2010.01)
*A47K 5/12* (2006.01)
*A47G 19/12* (2006.01)
*B29B 7/76* (2006.01)

(56) References Cited

U.S. PATENT DOCUMENTS

| | | | | |
|---|---|---|---|---|
| 4,962,866 | A * | 10/1990 | Phillips | 221/8 |
| 5,068,116 | A * | 11/1991 | Gibney et al. | 426/231 |
| 5,339,986 | A | 8/1994 | Mihalich | |
| 5,350,082 | A * | 9/1994 | Kiriakides et al. | 221/1 |
| 5,619,901 | A * | 4/1997 | Reese et al. | 99/275 |
| 5,797,519 | A * | 8/1998 | Schroeder et al. | 222/129.1 |
| 5,960,701 | A * | 10/1999 | Reese et al. | 99/275 |
| 5,967,367 | A * | 10/1999 | Orsborn | 222/30 |
| 7,845,375 | B2 * | 12/2010 | Dorney | A47G 19/2227 141/104 |
| 2005/0242120 | A1 * | 11/2005 | Sato et al. | 222/146.6 |
| 2011/0163126 | A1 | 7/2011 | Carpenter et al. | |
| 2011/0168738 | A1 | 7/2011 | Nevarez et al. | |
| 2011/0315711 | A1 * | 12/2011 | Hecht et al. | 222/129.1 |

OTHER PUBLICATIONS

Written Opinion Report dated Oct. 30, 2014 for PCT application No. PCT/US2014/038609.

* cited by examiner

HYBRID BEVERAGE DISPENSER

BACKGROUND

1. Field of the Disclosure

The present disclosure relates generally to a hybrid beverage dispenser that offers the user the flexibility of serving multiple types of beverages in a very compact footprint. The beverage dispenser provides flexibility of products served, configurations, and flexibility/ease of use. For example, the beverage dispenser may be configured to dispense blended ice drinks, smoothies, carbonated soft drinks, juices and teas and combinations of them. The beverage dispenser can dispense hot and cold drinks as well as a variety of ice types, such as shaved, nuggets and cubed/crushed, facilitating customer enjoyment of chewable ice forms, if desired.

2. Description of the Related Art

Currently restaurants serve a variety of beverages such as carbonated drinks and non-carbonated drinks. The state of the art of beverage dispensers is such that each different type of beverage served is provided from its own dispensing machine that is dedicated to that type of beverage. For example, a restaurant serving juice beverages and smoothies would provide two different beverage dispensing machines, one for dispensing the juice beverages and one for dispensing the smoothies. Similarly, a restaurant serving cold soda beverages and hot beverages such as tea, coffee and hot chocolate would provide two separate beverage dispensing machines, one for the cold soda beverages and one for the hot beverages.

Having separate dispensing machines for each type of beverage has several disadvantages, both for the restaurant establishment and for the user/operator. With respect to the restaurant establishment, the disadvantages include the need for sufficient counter and/or floor space to accommodate the individual footprint of each beverage dispensing machine. In addition, for the restaurant establishment and the user/operator, having separate dispensing machines for each type of beverage offered for sale requires the user/operator to move between beverage dispensing machines in order to dispense different types of beverages. This is inconvenient for both the user (consumer) and operator (restaurant establishment employees), providing for wasted time and effort. Separate dispensing machines also lead to additional problems, such as more service calls, increased preventative maintenance and calibration and the need to store and have available extra spares parts Thus, a need exists for a beverage dispensing machine that overcomes the shortcomings caused by having separate beverage dispensing machines for each type of beverage. The present disclosure provides a dispensing machine that overcomes the shortcomings and satisfied those needs.

SUMMARY OF THE DISCLOSURE

In one embodiment, the present disclosure provides a beverage dispenser comprising a point of use portion for use by an individual to make and dispense beverages, the point of use portion comprised of a plurality of dispensers for dispensing beverages, wherein the dispensers for dispensing beverages dispense at least two different beverages selected from the group consisting of blended ice beverages, carbonated beverages, non-carbonated beverages and combinations of any of the foregoing; and a user interface that provides sequential direction to the individual for making and dispensing the beverages. Preferably, the dispenser for dispensing ice beverages dispenses ice and refrigerated juice concentrates and/or blended ice ingredients. Also preferably, the dispenser for dispensing carbonated beverages and non-carbonated beverages dispenses both such beverages, wherein the dispenser dispenses syrup and carbonated and/or plain water, and more preferably, wherein the dispenser dispenses the carbonated beverages and non-carbonated beverages via a multi-flavor beverage nozzle where the syrup and carbonated and/or plain water are mixed together and dispensed. More preferably still, the point of use portion further comprises an ice maker for providing ice for the beverages and/or a blend chamber for blending the ingredients of the beverages.

In another embodiment, the present disclosure provides a user interface for providing stepwise directions to an individual for making and dispensing beverages from a plurality of beverage nozzles in a beverage dispenser, each beverage nozzle associated with a different type of beverage, wherein the user interface comprises a touchscreen; a plurality of touch activated buttons on the touchscreen, the plurality of touch activated buttons arranged in a plurality of subsets of buttons, wherein at least two subsets of buttons are associated with a different one of the plurality of beverage nozzles, wherein each subset of buttons is arranged to provide stepwise directions to the individual for making and dispensing the beverage associated with the subset of selectable buttons, wherein different beverage types are selected from the group consisting of blended ice beverages, carbonated beverages, non-carbonated beverages and combinations of any of the foregoing.

The hybrid beverage dispenser of the present disclosure can be configured in any one of a number of flexible arrangements, providing the opportunity to the restaurant establishment for a configurable beverage dispensing "station". In general, a remote chiller provides chilled syrups for the beverages; these chilled syrups are then delivered to a dispensing area on the hybrid beverage dispenser via known conduit technology, with recirculation of the syrups for optimum beverage temperature. In some configurations, the hybrid beverage dispenser of the present disclosure may be provided with "onboard" refrigeration that provides cooling for a plurality of blended ice ingredients, including juices and/or teas. In an alternative to the "onboard" refrigeration, an aluminum block type heat exchanger may be used in one of the bays of the hybrid beverage dispenser, as will be discussed below in more detail. Such a block type heat exchanger is known to those of skill in the art.

In alternative configurations, the hybrid beverage dispenser of the present disclosure may not have the "onboard" refrigeration but, rather, may be provided with ambient temperature storage space for supplies such as cups, lids and straws, a carbonated pump deck or to house vessels of sweetened and/or unsweetened tea or other ambient temperature products, such as beverage cartridges or other beverage holding apparatuses, as well as ingredients for iced tea and iced coffee. These ambient temperature products may then be dispensed via known syrup pump technology to a beverage dispensing nozzle. In another embodiment, the present disclosure provides for a countertop hybrid beverage dispensing unit for those restaurant establishments have limited space and/or have floor plan layout challenges for "full size" beverage dispensers. The countertop unit possesses the same beverage dispensing flexibility; however, all beverage ingredients are remotely chilled and pumped to the point of dispensing via known conduit technology/systems.

The hybrid beverage dispenser of the present disclosure allows for variations and flexibility in the shape of the unit, and a user-friendly touch screen accommodates one or more concurrent users/operators, while also allowing a choice of various beverage selections. The hybrid beverage dispenser of the present disclosure also allows for "banking" of multiple units into a "kiosk" type formation. In the kiosk type formation, accommodation may be provided for space between the individual hybrid beverage dispensers of the kiosk for storage and dispensing of, e.g., cups, lids and/or straws, among other similar items. The user-friendly touch screen provides a user interface that may also be configured so that the hybrid beverage dispenser may be utilized for restaurant employee beverage service and/or self-service applications, as desired. In addition, the user friendly touchscreen interface also facilitates the use of ADA compliant controls.

BRIEF DESCRIPTION OF THE DRAWINGS

The foregoing and other benefits of the hybrid beverage dispenser of the present disclosure will become further apparent to those skilled in the art from the detailed disclosure and the following Figures, in which.

DESCRIPTION OF THE PREFERRED EMBODIMENTS

Figure 1:
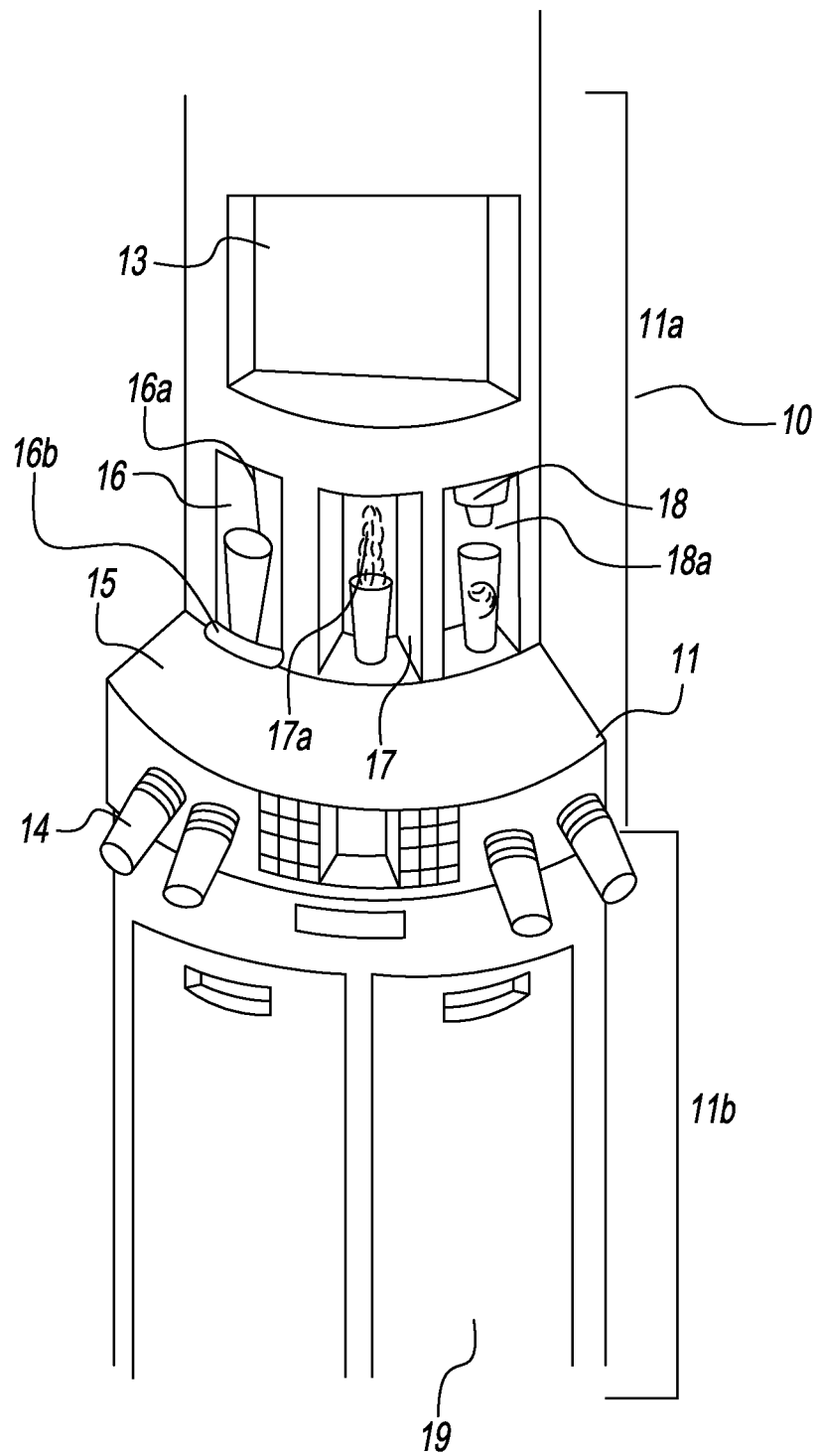
FIG. 1 is a front perspective view of a first exemplary embodiment of a hybrid beverage dispenser of the present disclosure.

Referring now to the Figures in more detail, in which like numbers denote like components/elements, FIG. 1 shows a front perspective view of a first exemplary embodiment of a hybrid beverage dispenser 10 of the present disclosure. Hybrid beverage dispenser 10 includes an outer cabinet 11. Outer cabinet 11 may include an upper cabinet 11a and a lower cabinet 11b. Upper cabinet 11a includes one or more dispensing bays 16, 17 and/or 18, a user interface 13, one or more beverage cup supply and dispensing areas 14 and a workspace counter 15. Upper cabinet 11a may be detachable from lower cabinet 11b so as to provide a counter-top version of the same hybrid beverage dispenser. In the counter-top version, upper cabinet 11a may be placed on a counter-top (particularly useful in those establishments lacking sufficient available floor space), and chilled beverages may be provided from a remote location. The counter-top configuration will be more fully described in conjunction with FIG. 7. User interface 13 permits the user/operator of hybrid beverage dispenser 10 to select from various types of blended, carbonated, juice and/or tea drinks, as well as providing step-by-step guidance to the user/operator with respect to assembling the desired beverage, as will be more fully described with respect to FIG. 5.

Each dispensing bay 16, 17 and/or 18 may perform a different function. As shown in FIG. 1, dispensing bay 16 includes a blender 16a that may be used for making drinks such as smoothies, blended juice drinks and other similar beverages. In the embodiment shown in FIG. 1, blender 16a is disposed behind a vertically slidable door 16b. Door 16b helps prevent splashing of blended drink/ingredients to workspace counter 15 and/or other locations. Also as shown in FIG. 1, dispensing bay 17 includes an ice dispenser 17a for dispensing nugget, shaved or chip ice. Dispensing bay 18 includes a multi-flavor beverage dispensing nozzle 18a that serves to provide the correct liquid ingredients for the beverage selected by the user/operator via user interface 13. This will also be explained more fully in conjunction with the description of FIGS. 5-8. Upper cabinet 11a also includes, as mentioned, workspace counter 15. Workspace counter 15 serves, inter alia, as a holding area for beverage cups 14 in various stages of completeness of the beverages being made in hybrid beverage dispenser 10.

Lower cabinet 11b includes one or more doors 19. Doors 19 provide access to an internal area of lower cabinet 11b (not numbered in FIG. 1). The internal area behind doors 19 may be refrigerated or may be maintained at ambient (room) temperature. If refrigerated, the internal area behind doors 19 may hold dispensing vessels for ingredients such as orange juice, tea, or other similar beverages such as are known to those skilled in the art. Although not shown in FIG. 1, it is contemplated according to the present disclosure that hybrid beverage dispenser 10 may include one or more an additional sections to a lower cabinet 11b and, preferably, the one or more additional sections may be heated and utilized for providing a supply of heated beverages to an additional dispensing bay (not shown) for dispensing hot beverages, such as tea, coffee, hot chocolate, or other hot beverages.

Figure 2:
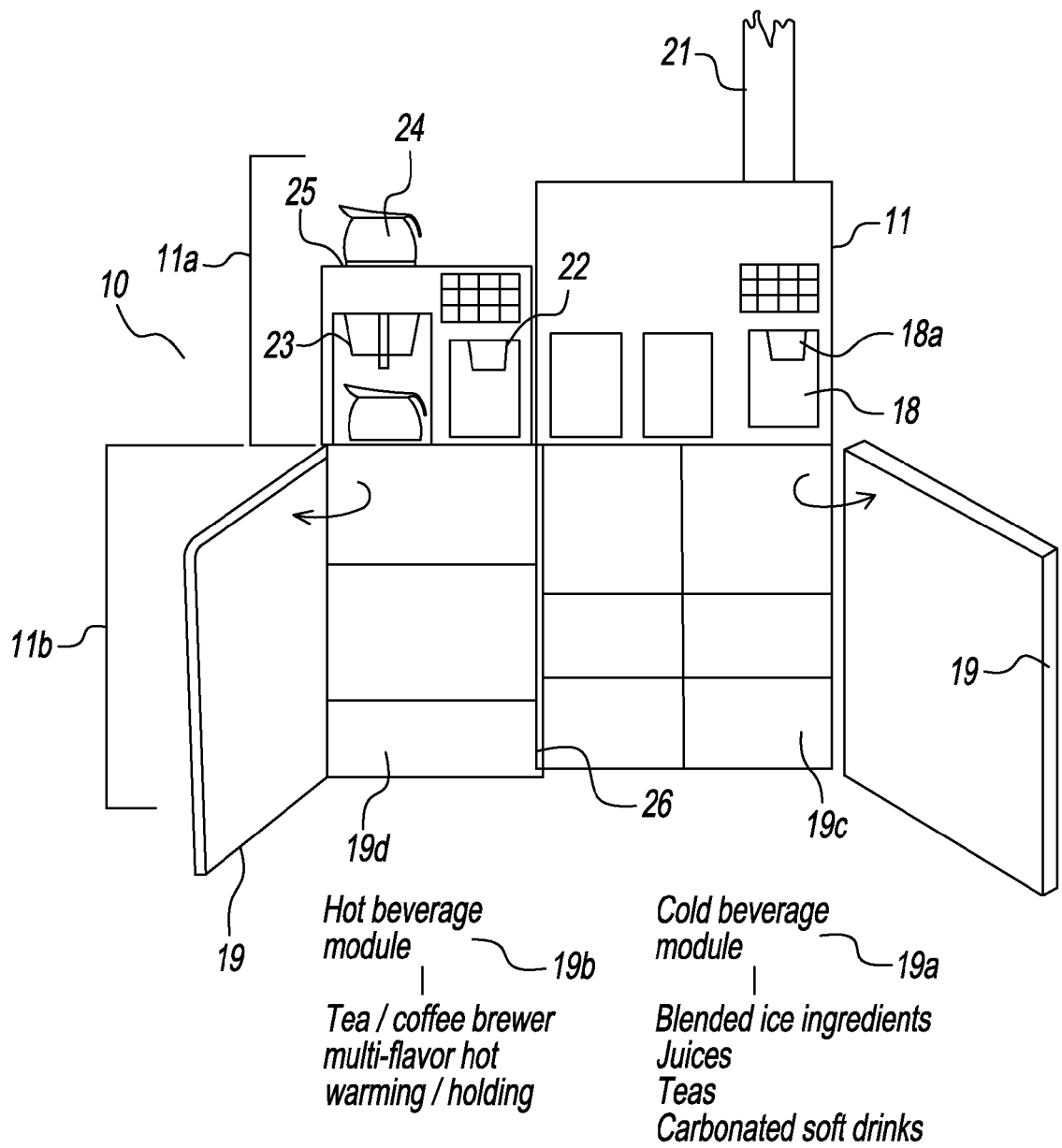
FIG. 2 is a front view of a second exemplary embodiment of a hybrid beverage dispenser of the present disclosure, with lower cabinet doors open.

Referring to FIG. 2, hybrid beverage dispenser 10 according to present disclosure is shown in which both hot and cold beverages may be dispensed from the same hybrid beverage dispenser 10. In FIG. 2, hybrid beverage dispenser 10 again includes cabinet 11 having upper cabinet 11a and lower cabinet 11b. Similar to FIG. 1 with respect to dispensing cold beverages, hybrid beverage dispenser 10 of FIG. 2 includes a plurality of dispensing bays 16, 17 and/or 18, only one of which, dispensing bay 18, is shown in the same configuration as with respect to FIG. 1, i.e., having multi-flavor dispensing nozzle 18a. Hybrid beverage dispenser 10 of FIG. 2 also includes doors 19. In FIG. 2, doors 19 are open and expose a cold beverage module 19a and a hot beverage module 19b. Also shown in FIG. 2, leading to multi-flavored dispensing nozzle 18a is a carbonated beverage conduit 21. The structure and function of carbonated beverage conduit 21 will be more fully explained in conjunction with FIGS. 6-8. In general, carbonated beverage conduit 21 serves to provide beverage ingredients to multi-flavor dispensing nozzle 18a. Also, hot beverage module 19b is provided with multi-flavor dispensing nozzle 22 for dispensing hot products. Hot beverage module 19b is also provided with a brew station 23, including at least one hot beverage container 24 and at least one heating plate 25. Internally, hot beverage module 19b also includes a cabinet 19d for holding powdered beverage equipment, such as those suitable for mixing dispensing powdered products with hot water, as well as a tea/coffee brewer and/or additional components for making/dispensing hot beverages. Cold beverage module 19a may contain a refrigerated compartment 19c, which may be used to store blended ice ingredients, juices, teas, carbonated soft drinks or similar cold beverage components, such as iced tea and/or iced coffee.

Again referring to FIG. 2, when lower cabinet 11b includes one or more of refrigerated compartment 19c for cold beverages and/or cabinet for powdered beverage equipment 19d for hot beverages, a wall 26 is provided between cabinet 19a and 19b. In this case, wall 26 will be insulated (not shown) to avoid excessive heat transfer and/or cooling losses between refrigerated compartment 19c and cabinet for powdered beverage equipment 19b. Similarly, doors 19 will be insulated (also not shown) so as to avoid temperature loss (cold or heat) from inside refrigerated compartment 19c or cabinet for powdered beverage equipment 19b to the outside atmosphere.

Figure 3:
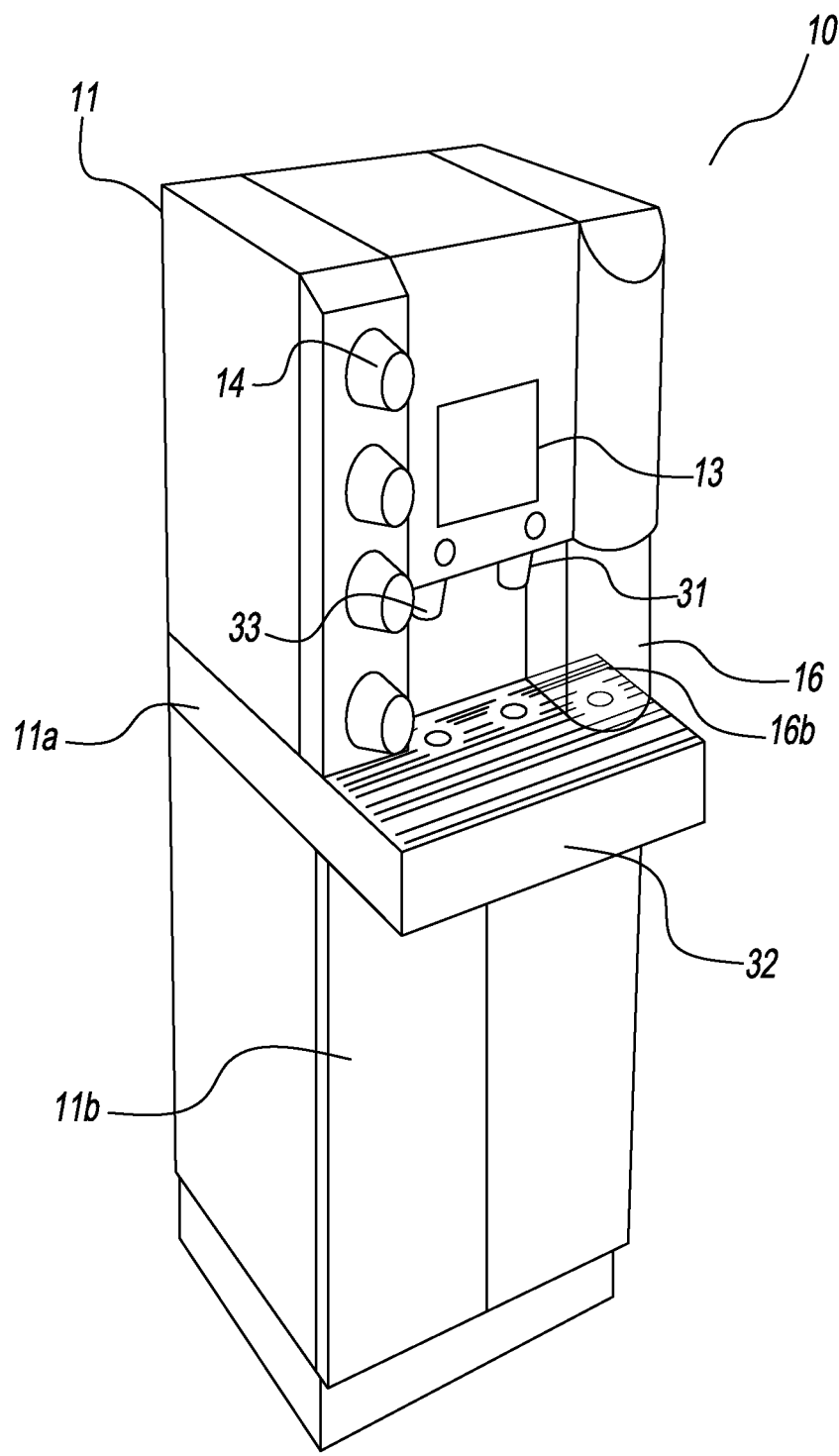
FIG. 3 is a front perspective view of the right side of a third exemplary embodiment of a hybrid beverage dispenser of the present disclosure.
Figure 4:
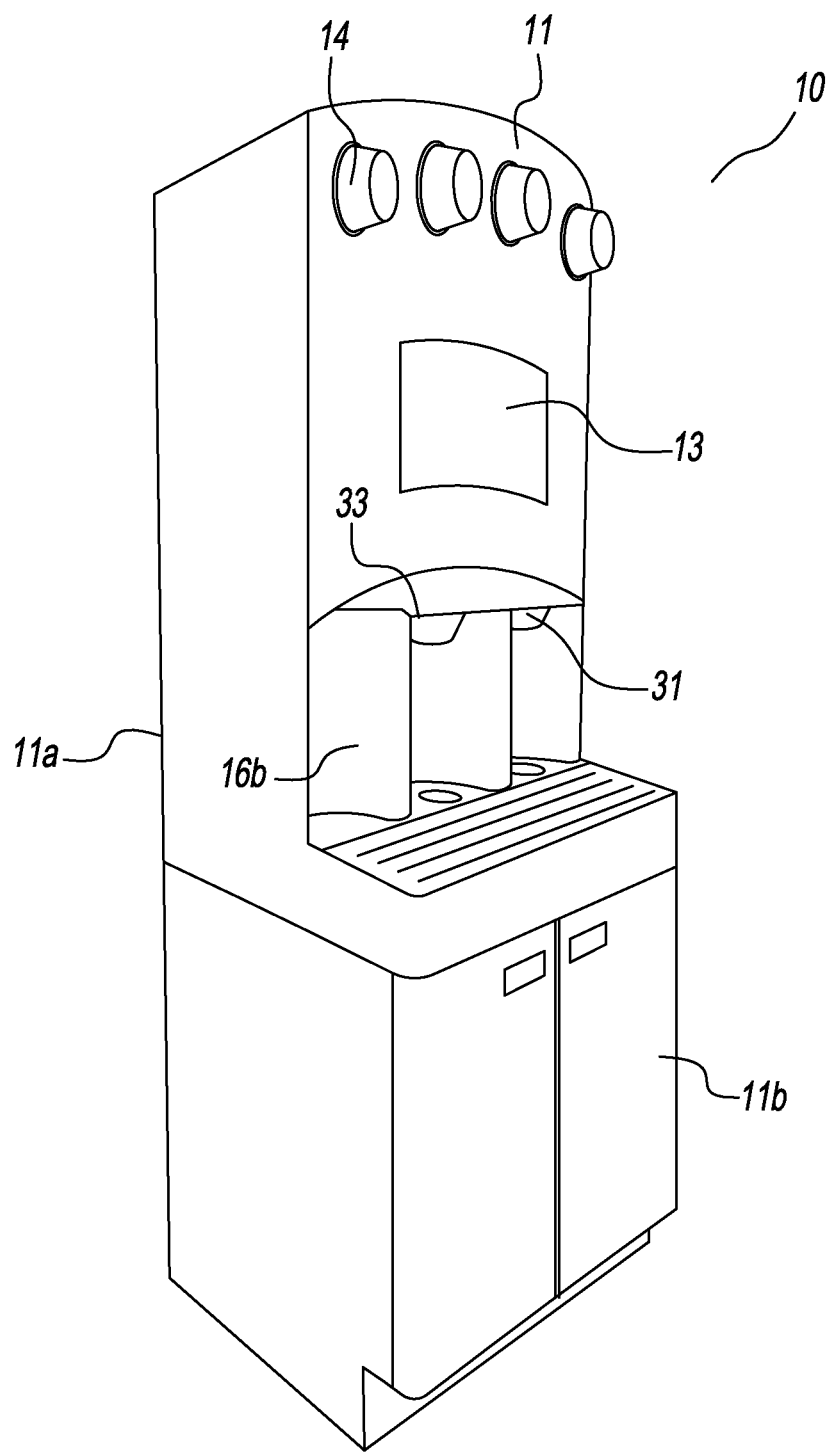
FIG. 4 is a front perspective view of the right side of a fourth exemplary embodiment of a hybrid beverage dispenser of the present disclosure.

FIGS. 3 and 4 show two alternate embodiments of hybrid beverage dispenser 10 of the present disclosure. In FIGS. 3 and 4, each embodiment of hybrid beverage dispenser 10 has outer cabinet 11, which includes upper cabinet 11a (used alone in those situations where a countertop model of hybrid beverage dispenser 10 is desired), and a lower cabinet 11b. As mentioned previously, lower cabinet 11b may be either refrigerated or kept at ambient (room) temperature. Each embodiment of hybrid beverage dispenser 10 shown in FIGS. 3 and 4 includes cup supply and dispensing areas 14, user interface 13 and blender bay 16 (which includes blender 16a, not shown). Of course, there may be more than one user interface 13, with each separate user interface 13 adapted to perform different or similar functions, as a matter of convenience. Each embodiment of hybrid beverage dispenser 10 of FIGS. 3 and 4 also includes a carbonated soft drink dispenser (CSD) 31, and an ice and product dispenser 33, which dispenses a combination of beverage product and ice (in nugget, shaved or chip form). The embodiment of hybrid beverage dispenser 10 shown in FIG. 3 also includes an ADA 32, for satisfying ADA requirements for self-service dispensing machines. Not shown in FIGS. 3 and 4 are any of the insulated beverage conduits; these will be discussed in detail in conjunction with FIGS. 6-8.

Figure 5:
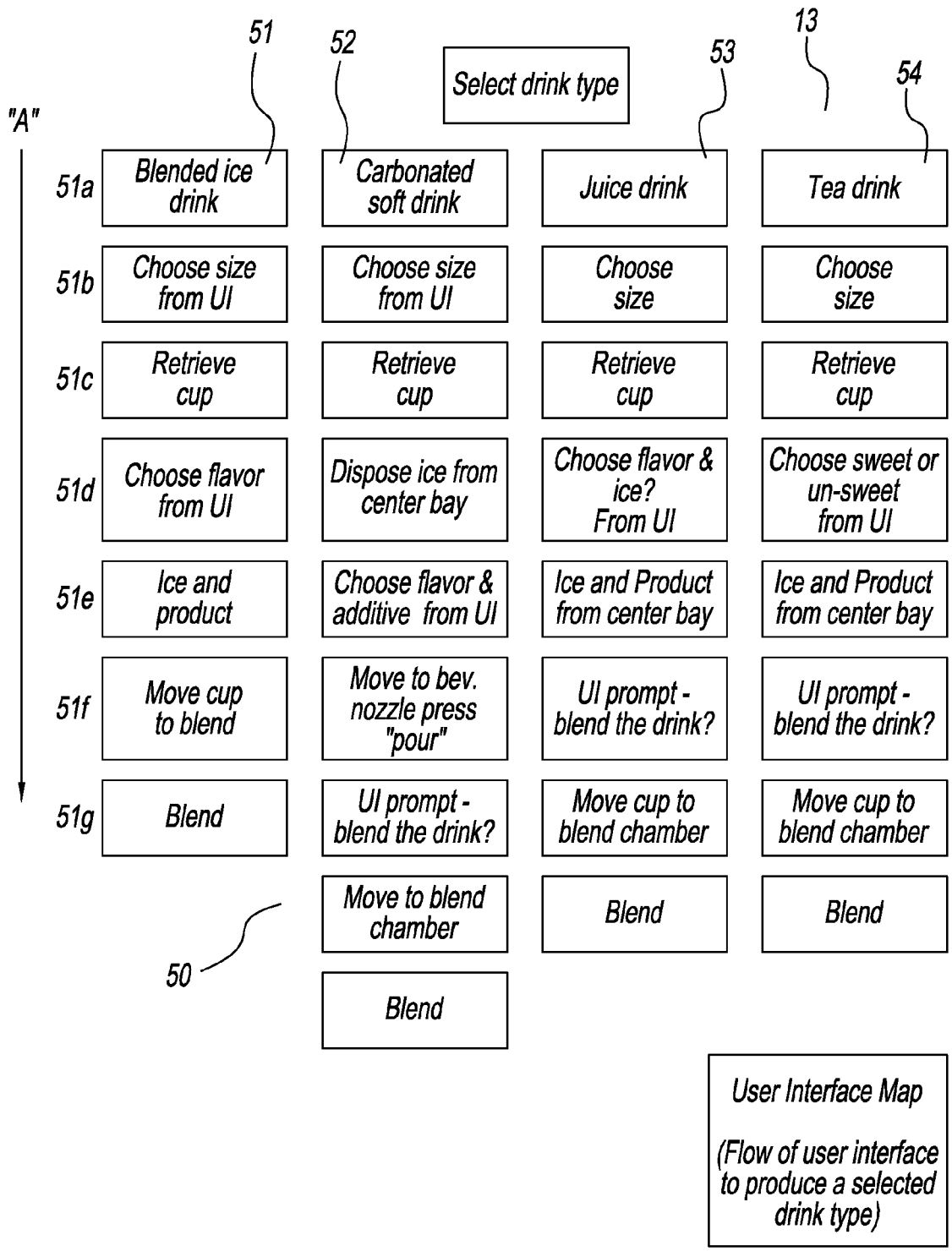
FIG. 5 is a schematic view of a user interface of the present disclosure that may be used with a hybrid beverage dispenser of the present disclosure.

Shown in FIG. 5 is a detail of user interface 13 showing a user interface map 50 for making, in the embodiment of user interface 13 shown in FIG. 5, four (4) different drink types: a blended ice drink 51; a carbonated soft drink 52; a juice drink 53 and a tea drink 54. User interface map 50 proceeds in the direction of the line "A" as will now be described in more detail. A user/operator approaches hybrid beverage dispenser 10 and selects, e.g., blended ice drink 51 from user interface 13 and presses blended ice drink button 51a and then is directed and proceeds to step 51b. In step 51b, the user/operator is instructed to choose the desired size of the selected blended ice drink 51 (size selections are displayed on user interface 13 but for simplification are not shown in user interface 13 in FIG. 5). In step 51c, the user/operator is instructed to retrieve the proper sized cup for the selected size of blended ice drink chosen in step 51b on user interface 13; the selection of the proper sized cup is done manually. In step 51d the user/operator is requested to select the flavor desired from user interface 13 (flavor options are displayed on user interface 13 but for simplification are not shown on user interface 13 in FIG. 5). The user/operator then places the selected cup, in step 51e at, e.g., ice and product dispenser 33 (see, FIG. 3), and a combination of ice and drink product is dispensed from ice and product dispenser 33. Then, because the selected drink type in step 51a was blended ice drink 51, the user/operator moves the cup to blender bay 16, where a blender blade (not shown in FIG. 5 or in the hybrid beverage dispenser of FIG. 3) in step 51f and, in step 51g, the blended ice drink is blended. When blending is complete, hybrid beverage dispenser 10 automatically stops blending blade (not shown) and the blended ice drink is complete. In similar fashion, following the direction of line "A" in FIG. 5 for any selected drink type, i.e., carbonated soft drink 52, juice drink 53 and/or tea drink 54, the same procedure, in general, will be followed. It should be noted that once the drink type has been selected in any of steps 51a-54a (in FIG. 5), very few operations are performed manually by the user/operator. In general, the manual operations are limited to retrieving the cup in, e.g., step 51c and moving the cup to the blender bay 16, if necessary, such as in step 51f (for blended ice drink 51).

Figure 6:
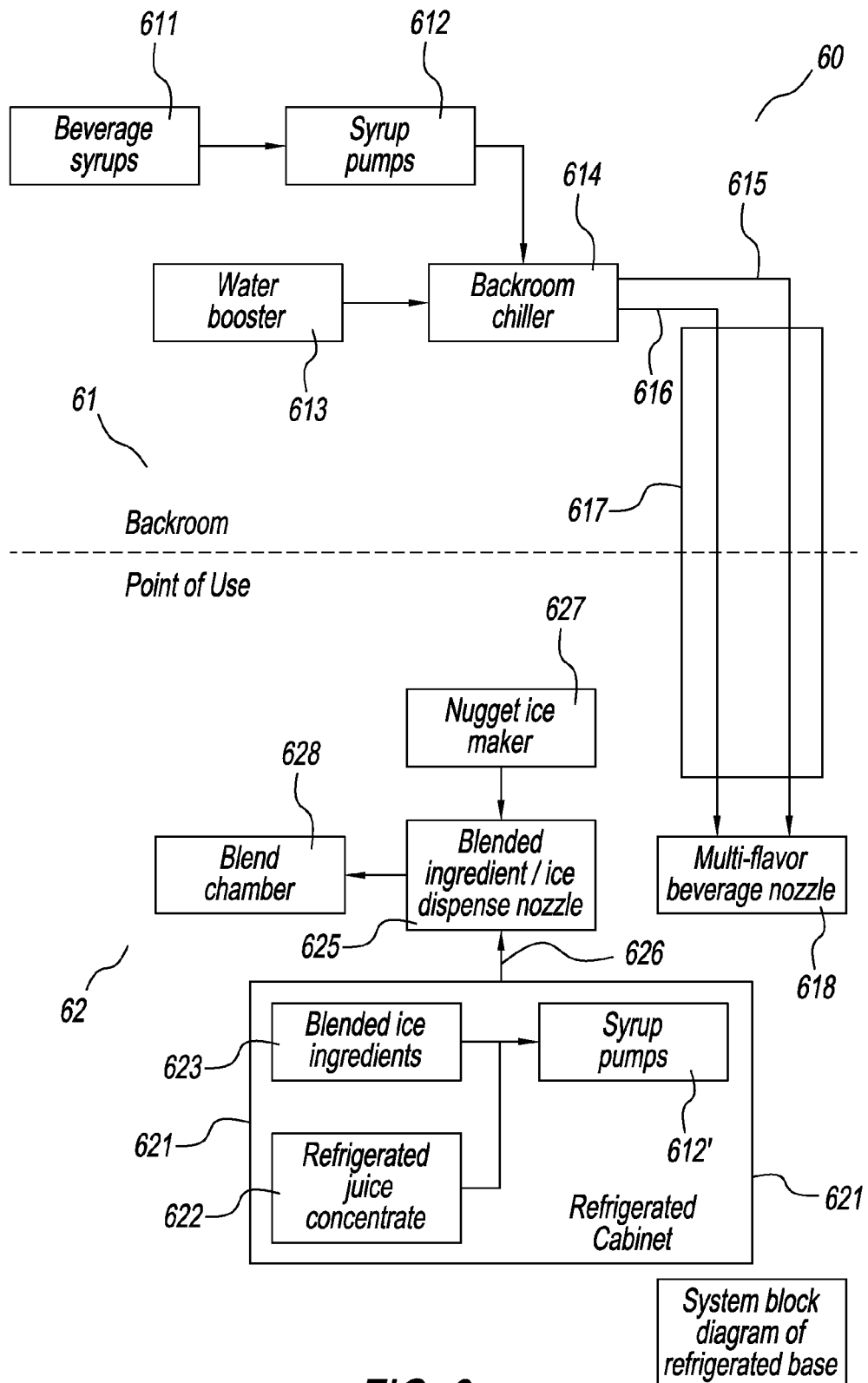
FIG. 6 is a system block diagram of a refrigerated base embodiment of a hybrid beverage dispenser of the present disclosure.
Figure 7:
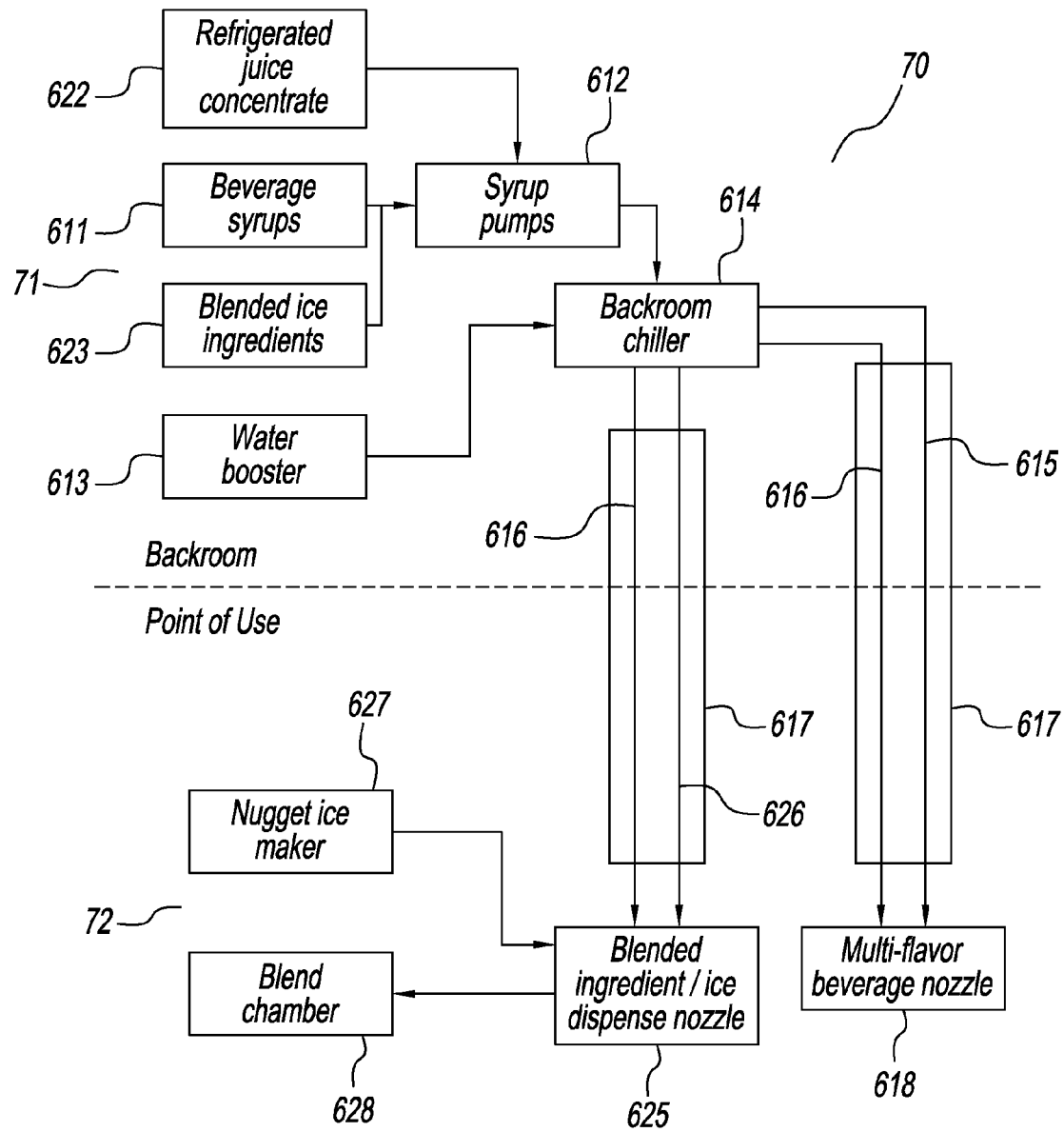
FIG. 7 is a system block diagram of a countertop embodiment of a hybrid beverage dispenser of the present disclosure.
Figure 8:
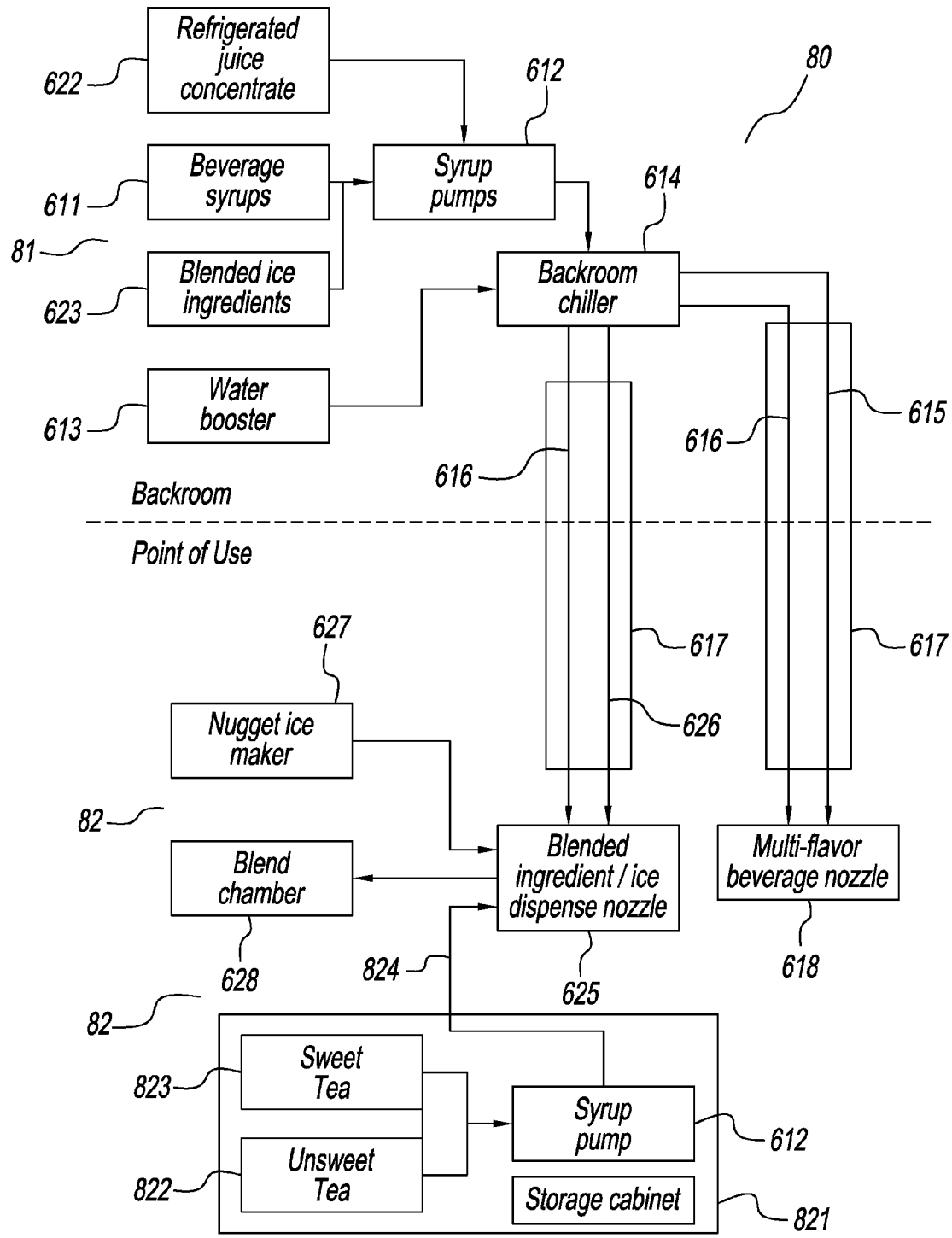
FIG. 8 is a system block diagram of a storage cabinet embodiment of a hybrid beverage dispenser of the present disclosure.

FIGS. 6-8 show different embodiments of pumping and dispensing systems of the hybrid beverage dispenser 10.

Referring first to FIG. 6, a configuration of a pumping and dispensing system 60 is shown. Pumping and dispensing system 60 includes a "back room" portion 61 and a "point of use" portion 62. Pumping and dispensing system 60 shown in FIG. 6 is in a configuration in which hybrid beverage dispenser 10 is in the form of one with a refrigerated base.

Turning first to back room portion 61, back room portion 61 includes one or more beverage syrups 611, one or more syrup pumps 612, a water booster 613, a back room chiller 614 (that includes, preferably, a carbonator, a syrup dispense line 615 and a carbonated/plain water dispense line 616). In operation, beverage syrups 611 are connected to syrup pumps 612 via one or more conduits (not numbered in FIG. 6), i.e., a conduit for each individual syrup 611. From syrup pump(s) 612, syrup(s) 611 are pumped to back room chiller 614 where they are chilled and dispensed through syrup line 615 to insulated beverage conduit 617. At the same time, carbonated/plain water is passed from water booster 613 through a conduit (not numbered in FIG. 6) to back room chiller 614 where the carbonated/plain water is then passed into carbonated/plain water line 616 and, likewise, into insulated beverage conduit 617. Syrup line 615 and carbonated/plain water line 616 proceed through insulated beverage conduit 617 from backroom 61 to point of use 62. At point of use 62, syrup line 615 and carbonated/plain water line 616 proceed to multi-flavor beverage nozzle 618 where they are mixed together and dispensed from multi-flavor nozzle 618 into an appropriate vessel at point of use 62.

In refrigerated cabinet 621 at point of use 62, refrigerated juice concentrates 622 and/or blended ice ingredients 623 (e.g., smoothie ingredients or other ingredients known to those of skill in the art) are pumped to syrup pump 612'. From syrup pump 612', blended ice ingredient 623 proceeds to blended ingredients/ice dispense nozzle 625 via blended ice syrup line 626. At the same time, ice in nugget form is produced in nugget ice maker 627 (although this may also be shaved or chip ice, as the case may be). Thereafter blended ingredient 623 and nugget ice from nugget ice maker 627 are dispensed via blended ingredients/ice dispensed nozzle 625 into an appropriate vessel. The vessel is thereafter transported to blend chamber 628 where it is blended into the final desired beverage.

Referring now to FIG. 7, a configuration of a pumping and dispensing system 70 is shown. Pumping and dispensing system 70 includes a "back room" portion 71 and a "point of use" portion 72. Pumping and dispensing system 70 shown in FIG. 7 is in a configuration in which hybrid beverage dispenser 10 is in the form of a counter-top hybrid beverage dispenser 10. Counter-top hybrid beverage dispenser 10 does not have a lower cabinet 11b and, thus, does not have room for any "on board" refrigeration system. As a result, chilled liquid ingredients are provided from a remote location.

In FIG. 7, some of the components of FIG. 6 have been rearranged or relocated. For example, refrigerated juice concentrate 622 and blended ice ingredients 623 have been moved from refrigerated cabinet 621 located in point of use 62 portion in FIG. 6 to a back room 71 of FIG. 7. While blended ingredient/ice dispense nozzle 625 remains at point of use 72 of FIG. 7, blended ingredients/ice dispense nozzle 625 is now connected to back room chiller 614 via its own insulated beverage conduit 617. At the same time, blended ice syrup line 626 is disposed in insulated beverage conduit 617 leading to blended ingredients/ice dispense nozzle 625, rather than disposed between refrigerated cabinet 621 and blended ingredients/ice dispense nozzle 625 (see, FIG. 6). Other than these reconfigurations and rearrangements, the functions of blended ice ingredients/ice dispense nozzle 626 and multi-flavor beverage nozzle 618, as reflected in FIG. 6, remain the same.

Referring now to FIG. 8, a configuration of pumping and dispensing system 80 is shown. Pumping and dispensing system 80 includes a "back room" portion 81 and a "point of use" portion 82. Pumping and dispensing system 80 shown in FIG. 8 is in a configuration in which hybrid beverage dispenser 10 is in the form of having an ambient temperature lower cabinet 11b.

In FIG. 8, the arrangement of the components in back room 71 is identical to those shown in FIG. 7 (although this need not necessarily be the case in all applications). Moreover, in FIG. 8, in point of use 82, components shown in point of use 72 in FIG. 7, i.e. blended ice syrup lines 626, insulated beverage conduits 617, multi-flavor beverage nozzle 618, blended ingredients/ice dispensed nozzle 625, nugget ice maker 627 and blend chamber 628 are also disposed and arranged in similar fashion to FIG. 7.

In FIG. 8, in point of use 82, there is provided ambient temperature storage cabinet 821 which includes syrup pumps 612 and supplies of unsweetened tea 822 and sweet tea 823. Although ambient temperature storage cabinet 821 is shown as containing unsweetened tea 822 and sweat tea 823, other beverage ingredients that are capable of being stored at ambient (room) temperature such as beverage module(s) and/or coffee. Ambient temperature storage cabinet 821 functions similarly to refrigerated storage cabinet 621 of FIG. 6, in that unsweetened tea 822 or sweet tea 823 are provided via conduits (not numbered) to syrup pump 612 and, thereafter, provided through an additional conduit 824 to blended ingredients/ice dispense nozzle 625 for dispensing, with nugget ice from nugget ice maker 626 to an appropriate vessel for blending in blend chamber 628.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A beverage dispenser comprising:
    a point of use portion for use by a plurality of individuals to concurrently make and dispense a plurality of beverages, the point of use portion comprised of a plurality of dispensers for dispensing beverages, wherein at least two of the plurality of dispensers dispense a beverage from a different beverage type selected from the group consisting of blended ice beverages, carbonated beverages, non-carbonated beverages and combinations of any of the foregoing; and
    a user interface comprised of a plurality of touch activated buttons on a touchscreen, wherein the plurality of touch activated buttons arranged in a plurality of subsets of buttons, and wherein each subsets of buttons provides sequential stepwise directions to each of the plurality of individuals for making and dispensing the beverage associated with the subset of buttons.

2. A beverage dispenser according to claim 1, wherein the point of use portion further comprises an ice maker for providing ice for the beverages and/or a blend chamber for blending the ingredients of the beverages.

3. A beverage dispenser according to claim 1, wherein the point of use portion further comprises a refrigerated base.

4. A beverage dispenser according to claim 3, wherein the refrigerated base holds blended ice beverage ingredients, carbonated beverage ingredients and/or non-carbonated beverage ingredients selected from the group consisting of juice concentrate, syrup and combinations of any of the foregoing.

5. A beverage dispenser according to claim 1, wherein the point of use portion further comprises an ambient temperature storage cabinet.

6. A beverage dispenser according to claim 5, wherein the ambient temperature storage cabinet holds ingredients for beverages selected from the group consisting of tea, coffee, hot chocolate, syrup pumps and combinations of any of the foregoing.

7. A beverage dispenser according to claim 1, wherein the point of use portion further comprises a base comprised of a refrigerated portion and a heated portion.

8. A beverage dispenser according to claim 7, wherein the refrigerated portion and the heated portion are adjacent to each other and have disposed therebetween an insulated divider.

9. A beverage dispenser according to claim 8, further comprising insulated doors enclosing the refrigerated portion and the heated portion.

10. A beverage dispenser according to claim 7, further comprising a dispenser for dispensing hot beverages from the heated portion.

11. A beverage dispenser according to claim 10, wherein the hot beverages are dispensed through a dispensing nozzle where hot beverage ingredients and hot water are mixed together and dispensed.

12. A beverage dispenser according to claim 1, wherein the sequential stepwise directions include instructions to each of the plurality of individuals to select a beverage flavor, and instructions to perform minimal necessary manual steps.

13. A beverage dispenser according to claim 12, wherein the sequential stepwise directions provide all the instructions for each of the plurality of individuals to make each of the plurality of beverages from start to finish.

14. A beverage dispenser according to claim 12, wherein the manual steps of the sequential stepwise directions are selected from the group consisting of retrieving a beverage cup and moving the beverage cup.

15. A user interface for providing sequential stepwise directions to a plurality of individuals for making and dispensing a plurality of beverages from a plurality of beverage nozzles in a beverage dispenser, each beverage nozzle associated with a different type of beverage, the user interface comprising:
    a touchscreen;
    a plurality of touch activated buttons on the touchscreen, the plurality of touch activated buttons arranged in a plurality of subsets of buttons, wherein at least two of the plurality of subsets of buttons are associated with a different one of the plurality of beverage nozzles, wherein each subset of buttons is arranged to provide sequential stepwise directions to each of the plurality of individuals for making and dispensing the beverage associated with the subset of buttons, wherein different beverage types are selected from the group consisting of blended ice beverages, carbonated beverages, non-carbonated beverages and combinations of any of the foregoing.

16. A user interface according to claim 15, wherein the sequential stepwise directions include instructions to each of the plurality of individuals to select a beverage size, select a beverage flavor, and instructions to perform minimal necessary manual steps.

17. A user interface according to claim 16, wherein the sequential stepwise directions provide all the instructions for each of the plurality of individuals to make each of the plurality of beverages from start to finish.

18. A user interface according to claim 15, wherein the manual steps of the sequential stepwise directions are selected from the group consisting of retrieving a beverage cup and moving the beverage cup.

* * * * *